A. ROBERTS.
AMMONIA SATURATOR.
APPLICATION FILED APR. 17, 1915. RENEWED MAY 9, 1919.
1,331,784.
Patented Feb. 24, 1920.
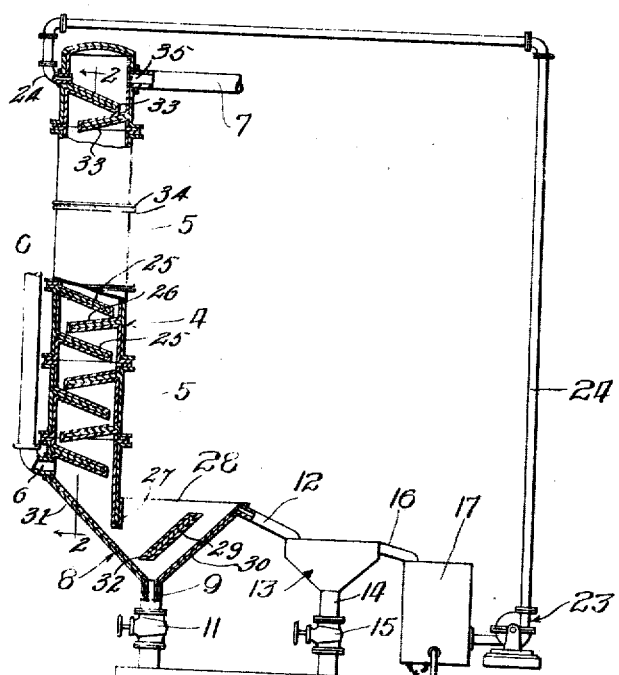
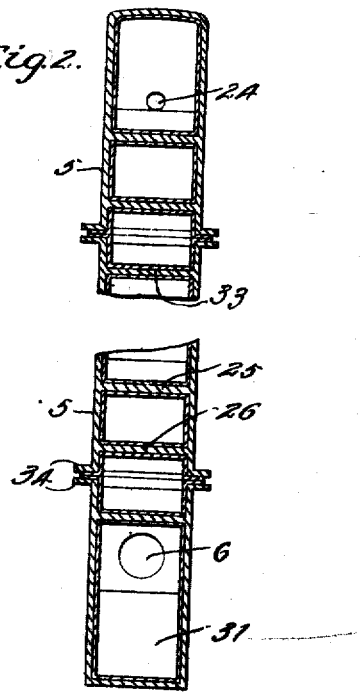
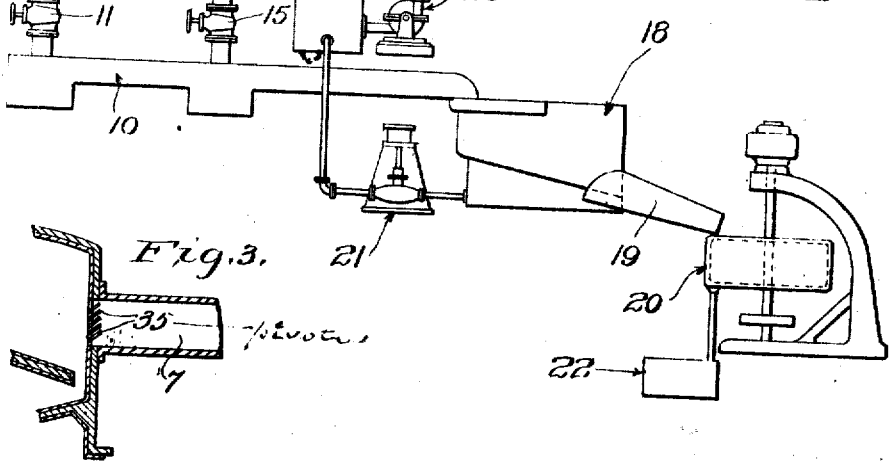
Witnesses:
Inventor
Arthur Roberts
by
Attys.

UNITED STATES PATENT OFFICE.

ARTHUR ROBERTS, OF EVANSTON, ILLINOIS, ASSIGNOR, BY MESNE ASSIGNMENTS, TO AMERICAN COKE & CHEMICAL COMPANY, OF CHICAGO, ILLINOIS, A CORPORATION OF MAINE.

AMMONIA-SATURATOR.

1,331,784.

Specification of Letters Patent. Patented Feb. 24, 1920.

Application filed April 17, 1915, Serial No. 22,144. Renewed May 9, 1919. Serial No. 295,926.

*To all whom it may concern:*

Be it known that I, ARTHUR ROBERTS, a citizen of the United States, residing at Evanston, in the county of Cook and State of Illinois, have invented certain new and useful Improvements in Ammonia-Saturators, of which the following is a specification.

This invention has reference to certain improvements in saturators or mechanisms for absorbing ammonia from a stream of gas into sulfuric acid or the like for the production of ammonium sulfate. Devices of this kind are ordinarily termed saturators. One of the objects of the invention is to devise a saturator of such construction that it can be built up from standard parts to any size or capacity which may be desired according to the conditions of the plant where it is to be installed. One of the benefits to be derived from this feature, for example, is the ability to adjust the size of the saturator for the removal of ammonia from gases carrying different quantities of ammonia in their body. For example, if the gas carries a large amount or percentage of ammonia the saturator may be constructed or adjusted of proper size so as to insure a complete removal of the ammonia, whereas if the gas only carries a small amount or percentage of the ammonia then the saturator may be made of smaller size as needed.

Another object of the invention is to so construct the saturator that the gas will be brought repeatedly and violently into contact with the acid so as to very perfectly and completely remove the ammonia, and in this connection also to so construct the saturator that the gas will be repeatedly forced to break through the body of the acid itself.

Another feature of the invention has reference to certain constructions whereby the sulfate salts are removed from the hopper without interference with the flow of acid and without interfering with the continuous operation of the saturator.

Other objects and uses will appear from a detailed description of the invention which consists in the features of construction and combinations of parts hereinafter described and claimed.

Referring to the drawing:

Figure 1 shows a side elevation of a complete saturating plant embodying the features of the present invention, the saturating column and hopper being shown in cross-section;

Fig. 2 shows a fragmentary section taken on the line 2—2 of Fig. 1 looking in the direction of the arrows, and Fig. 3 shows a fragmentary section of the upper portion of the saturating column on enlarged scale, and shows particularly a detail of the baffle plates 35.

Referring to Fig. 1 the saturator itself is designated in its entirety by the numeral 4. It is illustrated as comprising a series of units 5, the construction of which will be presently described in detail.

The gas containing the ammonia is delivered into the lower portion of the saturator by means of an incoming pipe 6, and after the gas has been treated in the saturator it is discharged therefrom through the discharge pipe 7.

As will be presently explained in detail, the sulfuric acid used for the removal of the ammonia and its conversion into ammonium sulfate, is flowed into the upper portion of the saturator through the pipe 24, the acid being forced through said pipe by the pump 23 which draws the acid from the tank or vat 17. This acid travels downwardly over the faces of the baffle plates 25, back and forth from side to side of the saturator, eventually finding its way into the hopper 8. The gas entering the saturator through the connection 6 is caused to flow upwardly between the successive baffles to the discharge pipe 7, the said gas breaking through the stream of acid or liquor adjacent to the edge of each baffle. Consequently, the gas is brought repeatedly into intimate contact or association with the liquor or acid, the number of times that such intimate contact or association is effected depending upon the number of baffles 25.

The liquor or acid and the crystals entering the hopper 8 pass beneath the liquor seal or weir 27, and the elevation of the liquor within the hopper 8 is at all times sufficient to maintain a liquor seal by means of the weir 27. Extending across the hopper 8, and parallel to its back wall 30, is a separator or partition 29. The lower edge 32 of this separator or partition is spaced from the front wall 31 of the hopper a sufficient distance to allow the crystals rolling down along the wall 31 to pass beneath the edge 32 of the partition 29 and into the upper end of the pipe 9. A valve 11 in the pipe 9 serves to regulate the delivery of crystals down through said pipe, and also serves to limit the delivery of liquor along with the crystals through the pipe 9.

The crystals collecting in the upper portion of the pipe 9 serve, to some extent, to limit the flow of liquor therethrough. Most of the liquor will find its way out from the hopper 8 by way of the spout 12, whence the said liquor will be delivered into a supplementary hopper 13. Any crystals passing by way of the spout 12 will collect in the supplementary hopper 13, whence they will be delivered through the pipe 14 into the chute 10 under control of the valve 15. The liquor and crystals passing down through the pipe 9 under control of the valve 11 also find their way onto the chute 10. Most of the liquor from the supplementary hopper will pass off through the spout 16 into the receiving tank 17.

The re-action of the sulfuric acid on the ammonia present in the gas will be as follows:

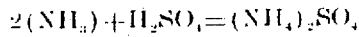

$$2(NH_3) + H_2SO_4 = (NH_4)_2SO_4$$

The chute 10 delivers the crystals ultimately to the drain table 18 wherein the bulk of the liquor passing over through the chute 10 is separated from the crystals, the crystals going by way of a spout 19 into the centrifugal 12 and the liquor collected in the lower portion of the drain table to be thence returned into the tank 17 by means of the pump 21. The dried crystals from the centrifugal are collected in the receiver 22.

From the foregoing it appears that all of the liquor is delivered eventually to the receiving tank 17. From this tank it is circulated back by means of a pump 23, through the pipe 24 into the top portion of the saturator.

Considering Fig. 2 I will now describe in detail the construction of the saturator itself. Each of the units 5 is preferably of rectangular cross section, having a pair of baffles 25 slanting down from one side and a baffle 26 slanting down from the other side. By setting these units on top of each other in alternate relationship as shown in Fig. 1 the combined baffle arrangement shown in Fig. 1 is produced. In the said figure the lowermost unit has its double baffle side at the right hand, the next unit has its double baffle side at the left hand, and the next unit has its double baffle side at the right hand, etc. Thus there is produced a resulting construction in which the number of baffles on the one side equals the number on the other side, the baffles alternating with respect to each other on the two sides.

The base unit of the saturator has the hopper 8 and the incoming pipe connection 6. This base unit is provided with the weir 27 which extends down a sufficient distance below the upper edge 28 of the hopper to provide a constant liquor seal, the liquor always standing at a sufficient elevation to submerge the lower edge of the weir. The elevation of the liquor within the hopper is determined, among other things, by the spout 12, which is located at the top of the hopper.

The valve 11 is for the purpose of controlling the delivery of crystals from the hopper. Upon the opening of this valve a stream of liquor carrying with it the crystals will pass down through the pipe 9, and the volume of this stream can be adjusted by the valve so as to insure a delivery of the crystals at substantially the same rate as that at which they are formed. Ordinarily the volume of this stream of liquor will be small as compared to the total volume circulated through the saturator, the balance of the liquor overflowing by way of the spout 12. In order to effect a more perfect separation of the crystals in the hopper 8 I have provided the baffle 29 lying substantially parallel to the back wall 30 of the hopper. The crystals will be delivered primarily on the front wall 31 of the hopper, and being of greater specific gravity than the liquor, will roll down along the face 31 and directly to the pipe 9. The clearance 32 between the lower edge of the baffle 29 and the front wall 31 of the hopper is large enough to easily pass the crystals, but the great bulk of the liquor stream is deflected by the baffle 29 directly toward the spout 12.

As a convenient form for each of the valves 11 and 15 I have shown the same as being in the form of a gate valve. The liquor stream delivered by the pipe 24 enters the saturator at the upper end thereof and travels down successively over the baffles 25 and 26 to the lower end. These baffles preferably extend substantially the full width of the saturator units as shown in Fig 2, so that they completely close said units with the exception of the open spaces 33 at their lower edges. These open spaces are so adjusted according to the capacity of the unit that they will be practically filled or entirely filled, by the down flowing stream of liquor. By reason of this fact the up flowing gas stream will be forced to break through the body of the liquor each time it passes the lower edge of one of the baffles, thus making it necessary for the gas to break through the liquor at the passage of each baffle. In the arrangement illustrated each unit has three baffles and will therefore subject the liquor and gas to this mixing action three times. If the gas be very rich in ammonia the number of baffles may be increased correspondingly so as to insure a complete removal of ammonia.

Each of the saturator sections is preferably made from cast iron or the like suitably lined on its interior surface with lead sheeting. The adjoining edges of the sections are provided with the flanges 34 which may be bolted or otherwise clamped together, and in order to insure a perfectly tight lead lining I have illustrated the lead sheeting as being flanged or turned over and clamped between the flanges. In addition to this the abutting lead surfaces may be burned together.

At the opening into the discharge pipe 7 there is provided a series of baffles 35. These are for the purpose of protecting the discharge gas pipe as much as possible from the entrance of liquor or acid thereinto. These baffles may be pivotally mounted, so that their angle of deflection may be changed or adjusted according to requirements.

While I have herein shown and described only a single form of construction embodying the features of my invention, still it will be understood that I do not limit myself to the same except as I may do so in the claims.

I claim:

1. In an ammonia saturator the combination with a vertical tower closed at its upper end and in communication with a hopper at its lower end, of a gas intake connection communicating with the lower end of said tower, a gas discharge connection communicating with the upper end of the tower, a plurality of baffles extending across the width of the tower, said baffles being arranged in two sets, one set commencing at one side of the tower and slanting downward toward the opposite side of the tower, and the other set commencing at the second mentioned side of the tower and slanting downward toward the first mentioned side of the tower intermediate the first mentioned baffles, said sets of baffles being mounted in staggered relationship, and each baffle terminating close to the opposite wall of the tower, a weir on the lower edge of the tower depending into the hopper, and a connection for liquor at the upper end of the tower adjacent to the uppermost baffle, whereby liquor delivered through said connection flows back and forth over the surfaces of the baffles from side to side of the tower in a stream of substantially sufficient body to close the spaces between the edges of the baffles and the walls of the tower, substantially as described.

2. In an ammonia saturator the combination with a tower closed at its upper end and in communication with a hopper at its lower end, of a weir on the lower edge of the tower depending into the hopper for the purpose of creating a liquor seal, a gas intake connection leading into the lower end of the tower, a gas delivery connection leading from the upper end of the tower, a plurality of baffles extending across the width of the tower and from side to side, said baffles extending in opposite directions from opposite sides of the tower in staggered relationship, and all of said baffles slanting downwardly, each baffle terminating close to that side of the tower opposite to the side from which it commences, and a liquor connection extending into the upper end of the tower adjacent to the uppermost baffle, whereby liquor delivered through said connection flows back and forth over the faces of the baffles alternately from side to side of the tower from the top thereof down to the liquor seal within the hopper, substantially as described.

3. An ammonia saturator comprising a base portion and a tower base, there being a weir on the lower edge of the tower base depending into the hopper and there being an inlet gas connection in the tower base, a plurality of tower sections mounted on said base, each tower section being provided with a baffle extending across the width of said section and from one side to a point close to the other side and slanting downward, said sections being built up with the baffles commencing alternately on opposite sides of the tower, and a top section closing over the top of the tower and having a gas delivery connection and a liquor inlet, whereby the central portion of the tower is built up from sections of standard form and size, substantially as described.

4. In an ammonia saturator the combination with a base section having a hopper and a tower base, and having a weir downwardly depending into the hopper and an inlet gas connection in the tower base, of a plurality of tower sections built up from the base to a desired height, each section having two baffles extending across the width of the section from one side to a point close to the other side, said baffles being parallel, and an intermediate baffle extending across the width of the section from the other side to a point close to the first mentioned side, the tower sections being set together alternately in reversed position with respect to each other, and a top section closing over the upper end of the tower, said top section being provided with a gas delivery connection and with a liquor inlet connection substantially as described.

5. In an ammonia saturator the combination with a saturating tower, of a hopper in communication with the lower end of said tower, there being a weir depending from the tower into said hopper, and there being an opening in the lower side of the hopper for the delivery of crystals therefrom, and a baffle within the hopper extending across the width thereof above said opening and lying parallel to one of the faces of the hopper, substantially as described.

6. In an ammonia saturator the combination with a saturating tower of a hopper in communication with the lower end of said tower, there being a weir depending from the tower into the hopper, the bottom of the hopper having its front and back faces sloping downward toward each other and there being a discharge opening in the bottom, and a baffle extending across the width of the hopper parallel to one of said faces, substantially as described.

7. In an ammonia saturator the combination with a saturating tower, of a triangular shaped hopper having its apex facing downwardly, there being a delivery opening at said apex the lower end of the tower being in communication with the hopper under liquor seal, there being a baffle within the hopper extending across the width thereof and lying parallel to that face of the hopper opposite to the lower end of the tower, substantially as described.

8. In an ammonia saturator the combination with a saturating tower, of a hopper in communication with the lower end of said tower, said hopper being of triangular shape and with the apex of the triangular facing downward, and there being a delivery opening in the hopper at that side thereof opposite to the tower, and a baffle within the hopper extending across the width thereof and parallel to that side in which the discharge opening is located, substantially as described.

ARTHUR ROBERTS.

Witnesses:
THOMAS A. BANNING, Jr.,
WM. P. BOND.